R. F. STEWART.
CREAMERY BUTTER BOX OR RECEPTACLE.
APPLICATION FILED NOV. 11, 1909.
954,220.
Patented Apr. 5, 1910.
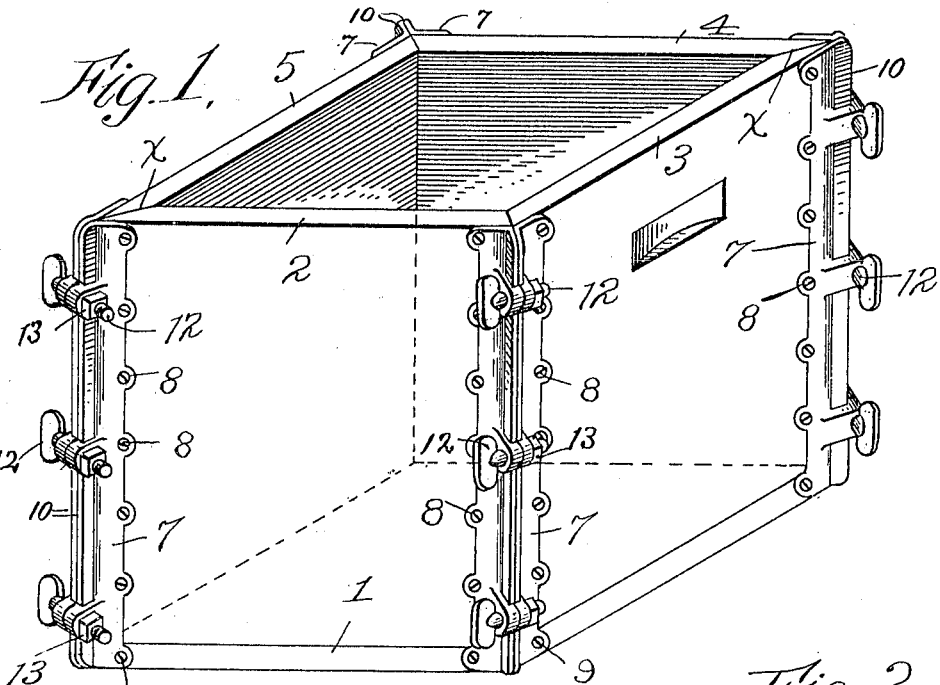
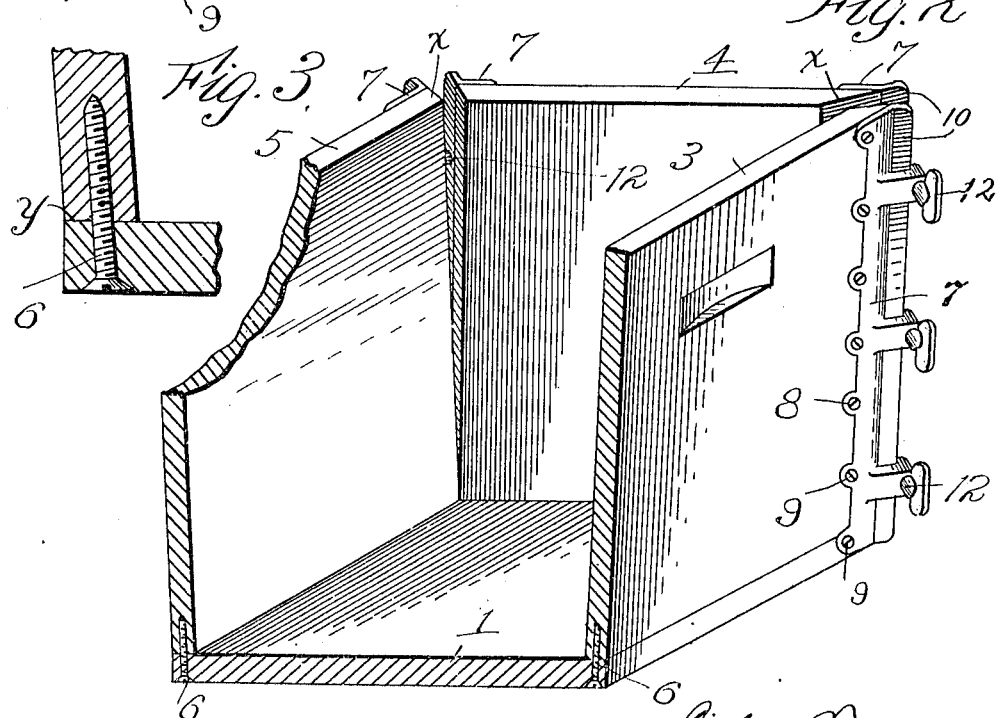

UNITED STATES PATENT OFFICE.

RICHARD F. STEWART, OF BRIARCLIFF MANOR, NEW YORK.

CREAMERY-BUTTER BOX OR RECEPTACLE.

954,220. Specification of Letters Patent. Patented Apr. 5, 1910.

Application filed November 11, 1909. Serial No. 527,516.

*To all whom it may concern:*

Be it known that I, RICHARD F. STEWART, a citizen of the United States, and resident of Briarcliff Manor, county of Westchester, State of New York, have invented certain new and useful Improvements in Creamery-Butter Boxes or Receptacles, of which the following is a specification.

The introduction of butter cutting machinery has almost entirely displaced the old system of making prints from soft butter, direct from the churn, and has caused the adoption of the newer system of packing the soft butter in boxes or tubs to harden over night and cutting the hard butter into bricks with a machine. In working under this new system of handling butter, the boxes now employed are objectionable not only on account of their expense but also because of the difficulty in removing the molded block of butter from the box. It has been proposed to employ an ordinary rectangular box, or a rectangular box with a removable bottom, or a box with tapered or flaring side walls which is larger at the top than at the bottom. The use of all of these forms of boxes is objectionable. When the butter is packed in an ordinary rectangular box it is impossible to remove the molded block of butter, without either destroying the box or impairing the molded form of the butter block. In the use of the rectangular box with a loose bottom, the brine from the butter is constantly leaking out and running over the boxes when they are piled one on top of another, and in removing the butter from such a box it is necessary to force it out by some kind of power. The box with the tapered or flaring sides simplifies the removal of the butter, but produces a molded block of butter with inclined faces which can not be economically cut up in a machine, because of the necessity of first squaring off the beveled faces of the butter block and then presenting the reduced rectangular block of butter to the machine for cutting. In view of these difficulties, it is very desirable, from an economical standpoint, to employ boxes of rectangular shape that can be used over and over again, and from which the butter can be easily removed. It is also desirable to have such a box which will be practically water tight, and will be of sufficient strength and durability to withstand the rough usage to which it is subjected.

I have produced an improved creamery butter box or receptacle in which the butter can be molded into a rectangular block and be readily removed from the box or receptacle without injury to the box or receptacle or the form of the block of butter.

I have produced a "self-freeing" case or receptacle for articles such as butter by forming a box of a bottom member and side members secured to the bottom member in such a manner that they will spread outwardly from each other at their edges, and means engaging the side members for overcoming their natural spreading tendency and confining them in intimate contact at their edges to form a rectangular containing box or receptacle. With this improved box, the butter can be packed into it when soft and placed away in a refrigerator until hard, when, by releasing the securing means for the side members, said side members will spread outwardly away from the hardened block of butter to free it so that it can be readily removed. The box can be used over and over again and the molded block of butter formed in it will be found to be in the most satisfactory shape for the operation of the butter cutting machine.

My improved containing box or receptacle may be formed in various ways without departing from the spirit of my invention. I prefer to build up the box from a rectangular bottom or base member and four side members properly fitted to the base member and having their lower edges beveled slightly to give them an outward set or inclination away from planes vertical to the bottom member. These side members are secured to the bottom member by screws or other suitable detachable securing devices so as to have a natural outward set to cause the adjacent edges of the side members to diverge toward the top. The adjacent edges of the side members are preferably beveled to correspond with each other and form a water tight fit when the side members are clamped together. Suitable clamping devices are arranged to engage the edges of the side members to force them into intimate contact against their natural spreading tendency, to form, when clamped into position, a rectangular case or receptacle having walls approximately vertical to the bottom. For the purpose of strengthening the side walls, I provide metal strips (preferably castings) extending from top to bottom of the meeting edges of the side walls and upon these strips are formed perforated projections to receive clamping screws or other suitable clamping devices. Another important commercial advantage resulting from my improved construction is the convenience for building up and taking apart the box or receptacle, thereby producing a box of the "knockdown" variety which can be compactly and economically shipped.

In order that my invention may be fully understood, I will first describe the same with reference to the accompanying drawings and afterward point out the novelty more particularly in the annexed claims.

In said drawings, Figure 1 is a perspective view of my improved creamery box or receptacle, with the side walls in closed position. Fig. 2 is a similar view of the same with parts broken away, showing the side walls spread apart at top. Fig. 3 is a detail vertical sectional view on a larger scale illustrating an exaggeration of the outward set or spreading tendency of the side walls from the bottom of the box or receptacle.

In constructing my improved "self-freeing" box or receptacle for packing and molding articles such as butter, I employ a bottom member 1 of rectangular shape, (preferably square, although it may be oblong), and four side wall members 2, 3, 4 and 5. These bottom and side wall members are preferably formed of a suitable wood. Each of said side wall members has its lower edge beveled or chamfered outwardly slightly as indicated at $y$ in Fig. 3 so as to give the side wall an outward set from the bottom member when it is attached to the bottom member. These side wall members are detachably secured to the bottom member by means of screws 6 which pass through the bottom member 1 up into the side wall members to hold the said members securely together at the bottom, while at the same time allowing them to spread apart slightly at the top, owing to their chamfered lower edges. The vertical edges of the said wall members 2, 3, 4 and 5 are cut or beveled upon an angle of 45° as shown at $x$ to afford broad meeting faces between the said members.

Each side wall member is preferably provided along its vertical edges with strengthening strips 7 of metal (metal castings being preferred), said strips being secured to the side members by suitable screws 8 as shown. These metal strengthening strips 7 are preferably projected below the lower edges of the side wall members sufficiently to engage the edges of the bottom member 1 at the corners and be secured to said bottom member by screws 9. The metal strengthening strips 7 are formed with outwardly presented projections, flanges or lugs 10, which may be in the form of continuous flanges, or separated ears or lugs. As shown, these strips are formed with continuous narrow flanges and separated heavy lugs. These projections 10 are presented in parallel relation to the vertical meeting faces of the wall members at the corners of the box or receptacle and have openings through them to receive clamping screws or bolts 12 provided with clamp nuts 13. These bolts 12 are preferably in the form of thumb bolts for convenience in operation. By tightening up the clamping bolts 12 the flanges or lugs 10 can be drawn closely together to cause the adjacent beveled edges of the side members to be brought into intimate water tight contact and said side members to assume positions approximately vertical to the bottom member, the side members being drawn inwardly toward each other against their natural outward set or spreading tendency.

In putting the box or receptacle together, the side wall members are mounted upon the bottom member as described and the clamping bolts put in place and screwed up tight to cause the side wall members to be drawn inwardly into perpendicular relation to the bottom member with their beveled edges in intimate contact. The butter or other similar material which is to be packed in the box or receptacle is then placed in the same and hardened by cooling, when it will be ready for removal. To remove the molded block of butter from the box or receptacle, the clamping devices 12 are unscrewed sufficiently to allow the side wall members to spread outwardly from each other and from the molded block of butter, which can then be readily removed without injury to its form. This molded block of butter is found to be in most convenient shape for the operation of a butter cutting machine. When the box or receptacle is to be shipped by the manufacturer, the bottom and side members and the clamping devices and screws are packed together in "knock-down" condition for shipment.

My improved box or receptacle provides a convenient creamery case in which soft butter can be molded and hardened into rectangular form and from which a molded block of butter can be conveniently removed without injury to the case or the molded form of the block of butter. The improved box or receptacle is made water tight and of substantial strength so that it can be used over and over again, thus economizing in the cost of the package and greatly facilitating the handling of the butter.

What I claim is:

1. A self-freeing box or receptacle comprising a bottom member, side members secured to the bottom member, and having a normal set or tendency to spread outwardly away from each other at the top, said side members being formed with complementary meeting edges, and means for securing said side members together with their meeting edges in intimate contact.

2. A self-freeing box or receptacle comprising a bottom member, side members secured to the bottom member, and having a normal set or tendency to spread outwardly away from each other at the top, said side members having correspondingly beveled faces upon their vertical meeting edges, and means for securing said side members together with their meeting edges in intimate contact.

3. A "knock-down" box or receptacle comprising a bottom member, side members detachably secured to the bottom member, and having a normal set or tendency to spread outwardly away from each other at the top, said side members having correspondingly beveled faces upon their vertical meeting edges, and detachable means for securing said side members together with their meeting edges in intimate contact.

4. A self-freeing box or receptacle comprising a bottom member, side members secured to the bottom member, and having a normal set or tendency to spread outwardly away from each other at the top, strengthening strips upon the meeting edges of said side members, projections formed upon said strengthening strips, and adjustable clamping devices engaging said projections.

5. A "knock-down" box or receptacle comprising a bottom member, side members detachably secured to the bottom member, and having a normal set or tendency to spread outwardly away from each other at the top, strengthening strips upon the meeting edges of said side members, projections formed upon said strengthening strips, and removable adjustable clamping devices engaging said projections.

6. A "knock-down" box or receptacle comprising a bottom member, side members detachably secured to the bottom member, strengthening strips upon the meeting edges of said side members, projections formed upon said strengthening strips, and removable adjustable clamping devices engaging said projections and serving to secure said side members together with their meeting edges in intimate contact.

7. A self-freeing box or receptacle comprising a bottom member, side members secured to the bottom member, and having a normal set or tendency to spread outwardly away from each other at the top, flanges projecting from the edges of said side members, screw bolts passing through openings in said flanges, and nuts engaging said bolts.

8. A containing box or receptacle comprising a bottom member, a plurality of side members having chamfered lower edges secured to the bottom member and spread outwardly therefrom with their adjacent edges separated at the top, and adjustable clamping means for securing said side members together with their adjacent edges in intimate contact.

9. A rectangular containing box or receptacle comprising a bottom member, side members secured to the bottom member, flanges secured to the edges of said side members, clamping means engaging said flanges for securing said side members together at their edges, and means for causing said side members to separate and incline outwardly when said clamping means are released.

RICHARD F. STEWART.

Witnesses:
  WM. E. KNIGHT,
  LAURA E. MONK.